April 14, 1964     L. NICKLA     3,128,587
COTTON HARVESTER WITH TRASH DISCHARGE MEANS
Filed April 1, 1960     3 Sheets-Sheet 1

INVENTOR.
Louis Nickla

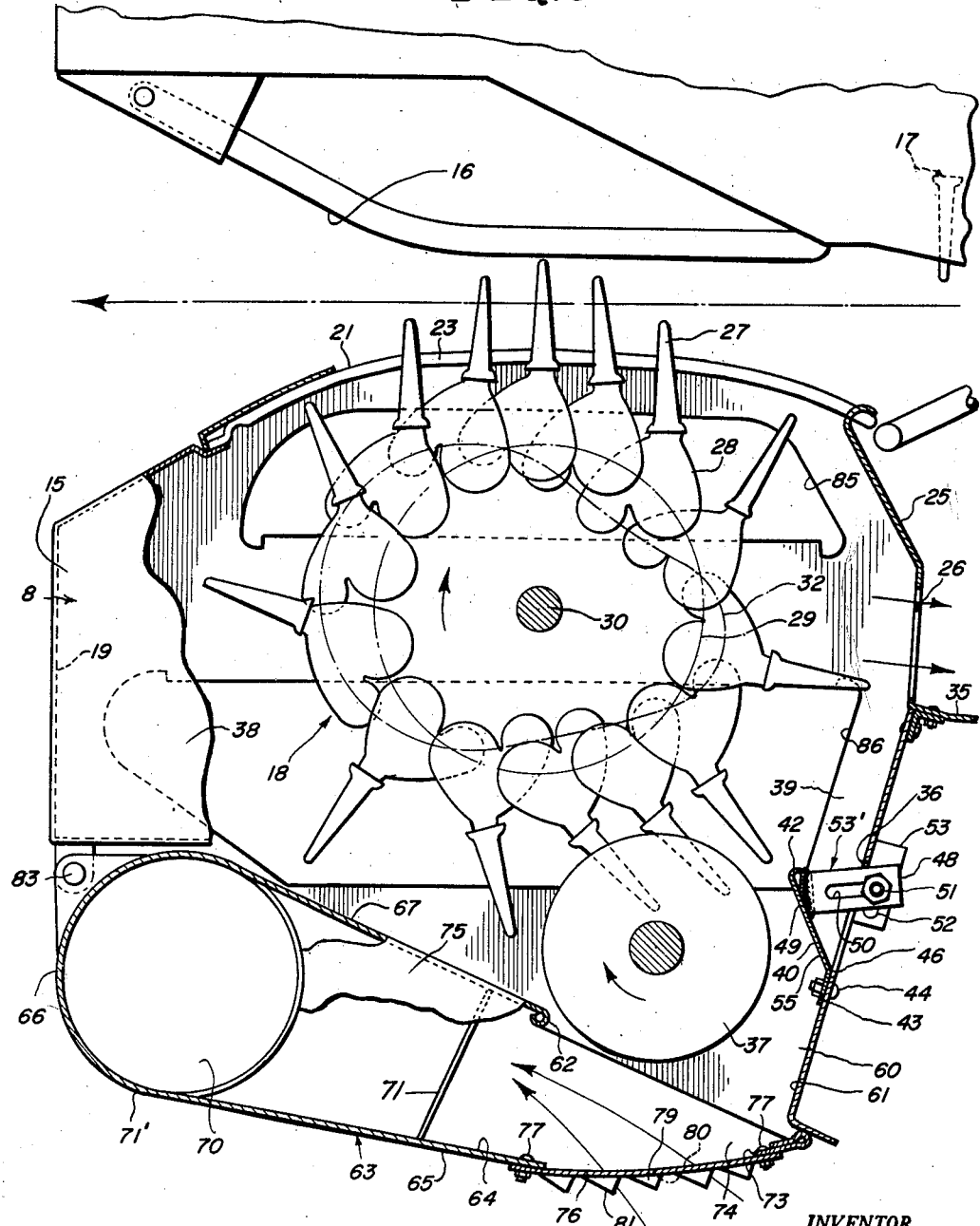

April 14, 1964

L. NICKLA 3,128,587

COTTON HARVESTER WITH TRASH DISCHARGE MEANS

Filed April 1, 1960

INVENTOR.
Louis Nickla

Paul O. Pippel
Atty.

United States Patent Office 3,128,587
Patented Apr. 14, 1964

3,128,587
COTTON HARVESTER WITH TRASH
DISCHARGE MEANS
Louis Nickla, Memphis, Tenn., assignor to International Harvester Company, Chicago, Ill., a corporation of New Jersey
Filed Apr. 1, 1960, Ser. No. 19,368
1 Claim. (Cl. 56—41)

This invention relates to cotton harvesters and more specifically to a type which mechanically picks the cotton and wherein a pneumatic conveying means is employed for carrying the cotton from the harvester to the associated receptacle.

Cotton harvesters to which the present invention is applicable comprise a housing which affords a plant throat receiving a row of cotton plants therein alongside a picker drum which comprises a series of vertically spaced spindles arranged to move with the drum from front to rear within the picking throat and to snag the cotton and withdraw the cotton and enter the same into the housing wherein a doffing mechanism is employed to remove the cotton from the spindles, the cotton being deposited in a region of suction wherein it is entrained in air and carried into an associated basket or receptacle. In certain instances it is desirable to take advantage of the mechanism to sift out large foreign matter such as branches and leaves, etc., before the cotton is delivered to the receptacle.

The general object of the invention is to provide in a cotton harvester of the type which employs outwardly projecting spindles on a rotary picking drum, a novel exit in the rear wall structure of the cotton harvester adjacent to which the cotton filled trash laden spindles emerge from the cotton plants in order to discharge the trash centrifugally rearwardly while the cotton is being carried by the spindles to doffing mechanism.

A corollary object of the invention is to provide a novel arrangement for admitting fresh air into the suction line in a position where it will not influence or draw a stream of trash along with the cotton through the picking drum, the invention particularly contemplating the provision of novel louvered doors wherein any trash accumulating in the drum is caused to sift out through the louvers and any large objects such as branches and the like are caused to be directed in a trailing relation to the direction of travel of the machine and in brushing contact with plants in an adjacent row so that the plants sweep against and brush off extraneous objects from the louvered structure.

A still further object of the invention is to provide in combination with the rear discharge opening and the control for drawing in fresh air, a novel tunnel structure and shielding on the basket so as the cotton and trash mixed therewith is discharged from the conduit pipe into the basket it is caused to slither along a grill whereby the light trash, etc., is caused to discharge through the grill, the basket at opposite sides of the grill being completely shielded to prevent the trash from re-entering into the basket which is normally of perforated construction accommodating sifting out of the dirt through the bouncing action of the machine over the field whereby the trash material is caused to gravitate downwardly and sift out from the basket of cotton.

A further object of the invention is to provide a novel adjustable vane on the rear wall of the cotton picker housing such that the opening for discharging trash is adjustable to meet varying conditions.

These and other objects of the invention will become more apparent from the specification and the drawing, wherein:

FIGURE 3 is a fragmentary horizontal sectional view on an enlarged scale taken substantially on the line 3—3 of FIGURE 1;

Figure 1:
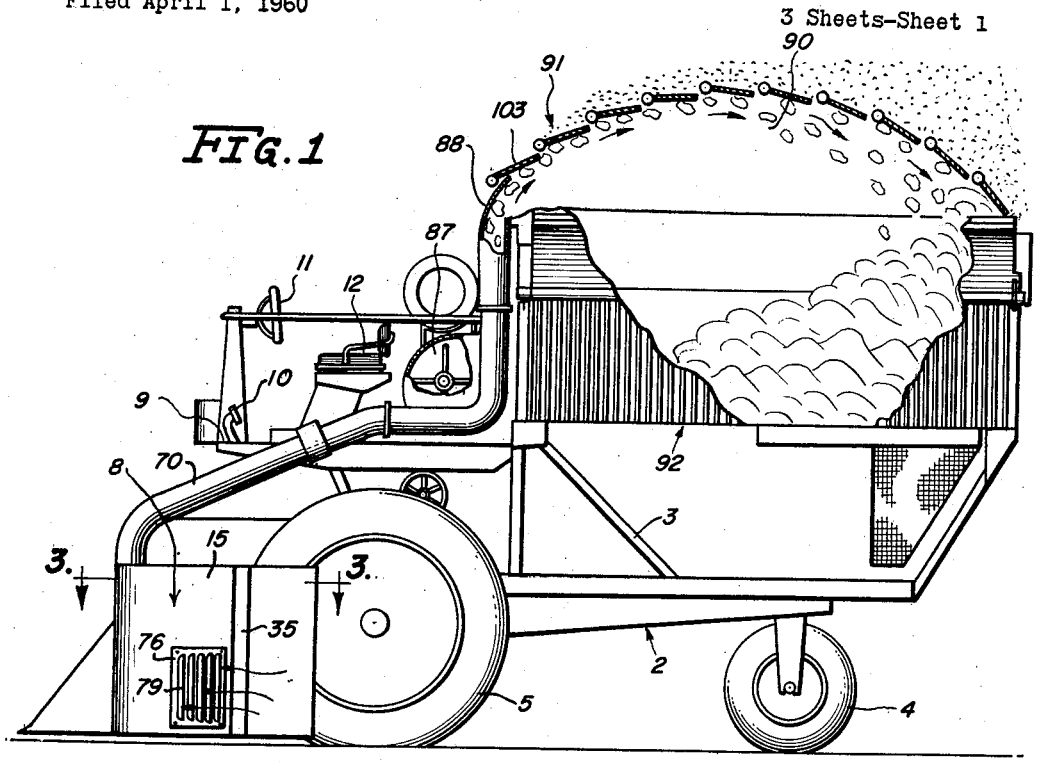
FIGURE 1 is a side elevational view of a cotton harvester incorporating the invention with portions broken away and shown in vertical section.
Figure 2:
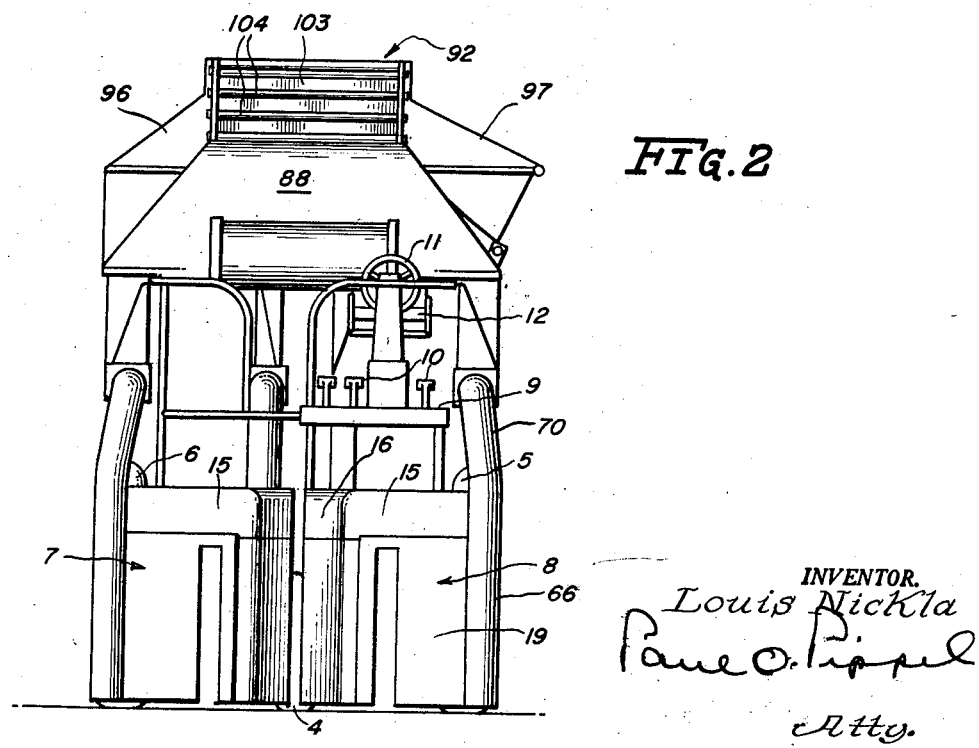
FIGURE 2 is a front elevational view of the cotton harvester incorporating the invention.

Describing the invention in detail the picking machine which is chosen by way of illustration comprises an ambulatory carrier generally designated 2 which includes a frame structure 3 supported on the steering wheel 4 and large traction wheels 5 only one of which is shown and supporting the picking units 7 and 8 forwardly of the traction wheels below the platform 9 which is integrated with the framework 3 and comprises the usual controls 10, the steering wheel 11 and the driver's seat 12.

The specific mounting as will be readily understood by those skilled in the art is unimportant and is more or less conventional as is well known in the art.

Each of the drums 7 and 8 are counterparts of one another except that they are of looking-glass symmetry and each comprises a housing 15 which provides a plant throat 16 in between the picking drums 17 and 18 positioned on the right and left side of the passage 16 respectively.

Figure 5:
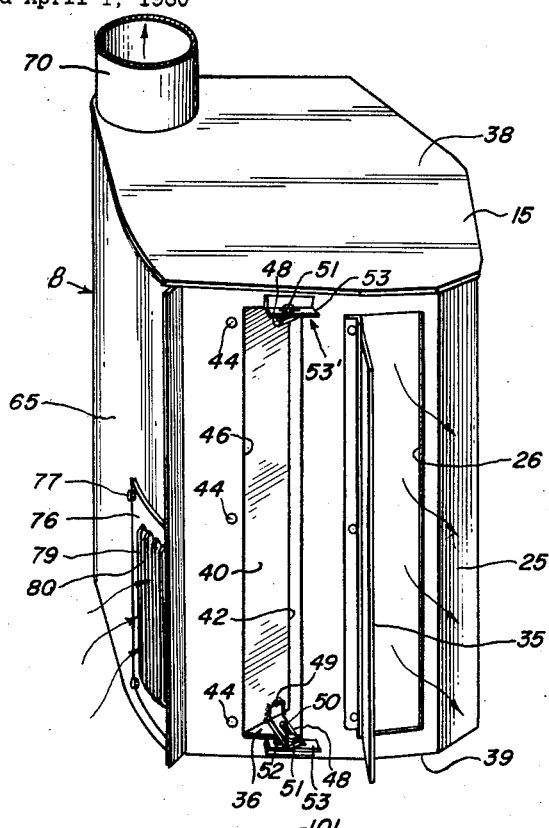
FIGURE 5 is a rear perspective view of one of the cotton picking units.
Figure 4:
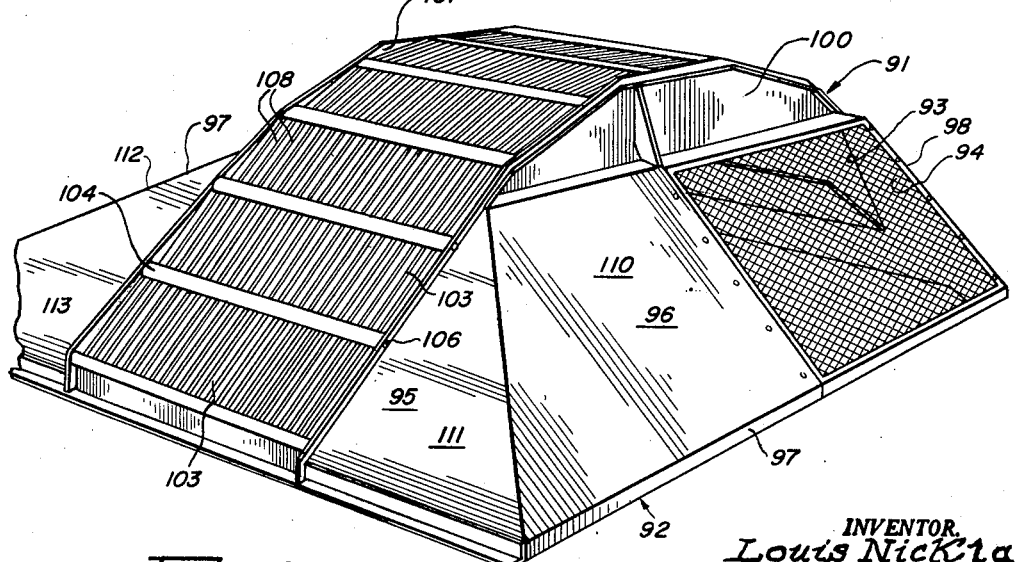
FIGURE 4 is an enlarged top isometric view of a novel basket cover.

The left picking unit 18 which is illustrative of the invention is mounted in the housing behind the front or forward upright wall structure 19 which is generally imperforate and extending around the front portion of the unit 18. The exact configuration of the front portion of housing structure 15 is unimportant, however, it does enclose completely the forward end of the picking mechanism. Side wall structure 21 extends from the inner end or edges of forward portion of housing structure 15 rearwardly. As is conventional, the housing structure 21 adjacent to the passage 16 is formed of a plurality of vertically spaced horizontal grid bars 23 which form between them fore and aft extending passages through which the spindles on the picking drum as hereinafter explained may proceed into the passage 16. The rear of the unit 18 is provided with an upright rear wall structure 25 which is provided with a vertical elongated trash discharge opening 26 disposed adjacent to the plant throat 16 and in a position wherein the cotton and trash laden picker spindles 27, which are mounted on columns 28 and which are carried on the drum or rotor 29 for rotation within the housing on the shaft 30 as is conventional, swing with a flipping effect about the cam radius represented at 32 to discharge the trash through the rear discharge opening 26 as the spindles withdraw from the plant passage and enter into the forward portion of housing structure 15. It will be seen that the spindles 27, as well known to those skilled in the art, in addition to being moved from front to rear in a direction shown by the arrow in FIGURE 3 also rotate on their individual axes and move in the orbit shown in FIGURE 3. It will be noted that the initial discharge of trash, etc., occurs through the opening 26 opposite to the crest of curvature of the cam profile as indicated by reference numeral 32 and the rear wall structure at the edge of the slot remote from the plant throat 16 is provided with a rearwardly extending baffle or plate 35 to prevent the material which is being discharged through the passage 26 from being thrown and possibly recirculated through a second passage 36 which is formed in the rear wall structure 25 as is best seen in FIGURES 3 and 5. It will be noted that the opening 36 is positioned rearwardly of the doffers 37 which are rotatably mounted in the conventional manner from the top and bottom walls 38 and 39 of the housing 15. The opening 36 serves as a secondary discharge for trash which may be carried by the spindles 27 past the opening 26 and the trash is cut off from entry into the doffing mechanism by means of a baffle 40 which projects inwardly from the rear wall structure and is substantially an upright plate member, the baffle extending diagonally from the rear wall structure in the direction toward the peripheral orbit of the spindles at an obtuse angle thereto and serves with its inner edge 42 as a cut-off for trash and guides the same diagonally outwardly through the opening 36. It will be seen that the plate 40 has a rear mounting flange or tab 43 by which it is bolted at 44 to the rear wall structure 25 along the downstream edge 46 of the vertical upright elongated opening. The flap or flange or plate 40 is adjustable inwardly and outwardly with respect to the orbital path of the spindles to change the angle of incidence of the material thereagainst by flexing the same at its juncture with the mounting flange 43, the adjustment being effected by means of a pair of upper and lower straps or lugs 48 each of which is connected at its forward end as at 49 to the adjacent end of the plate and extends horizontally rearwardly and is provided with an elongated slot 50 which admits a bolt and nut assembly 51 therethrough, the assembly also connecting through a slot 52 to a tab or lug 53 on the rear wall structure 25. It will be readily appreciated that the baffle or vane is adjustable forwardly and rearwardly and by springing the same and its adjustment is maintained by means of the adjusting means generally designated 53' as hereinbefore explained.

It will be noted that the forward side 55 of the baffle 40 affords a guide for the lint cotton which is being discharged by the doffers 37 so that the same is channelled through the space 60 between the rear side of the doffing mechanism and the forward side 55 of the plate and the forward side 61 of the rear wall structure whereby the said cotton is deposited adjacent to the inlet opening 62 in the drum door 63.

The opening 62 is in transverse alignment with the doffer 37 and is disposed in the rear compartment 64 of the drum door, the rear compartment being defined by an upright outer panel 65 which merges into a forward curved wall structure 66, the wall structure 66 projecting rearwardly on its inboard edge into an upright inner panel 67. The drum door is subdivided into the rear and forward compartments 64 and 70 by means of a diagonal panel 71 which extends between the walls 67 and 65 and connected thereto, the wall 65 curving rearwardly and inwardly at its rear portion and closing off the rear part of the drum door.

It will be realized that the door structure 63 is imperforate in its forward compartment 70 wherein it joins at its upper forward end into the conduit structure 71' but that the rear compartment is perforated. The perforation is accomplished by providing a large opening at 73 in the outboard wall 65 in a region opposite the opening 62 adjacent to the bottom end of the compartment 64 which is closed off at its bottom end by the bottom wall 74, the upper end of the door being closed by the upper wall 75, the structure is well known to those skilled in the art.

The opening 74 is closed off by a louvered grill designated 76 and the grill being formed of sheet metal which is bolted as at 77 to the outer wall structure 65 about the periphery of the opening 73, the grill comprising a series of upright outwardly rearwardly diagonally directed louvers 79 which shield the corresponding opening 80 from which the louvers have been punched out. It will be observed that the flaps 79 are angled outwardly and rearwardly with respect to the direction of travel of the machine represented by the arrow in the throat 16 in FIGURE 3. This has been found to have the effect of accommodating a free flow of air without breaking the plants in the next adjacent row along which the harvester is operating and any accumulation of branches or large pieces of material which work themselves through the louvered structure from the housing are facilitated exit because of the brushing action of the plants against the outer side 81 of the drum door panel 65. This sweeping action continuously maintains the openings clog free as compared with screens and the like which tend to quickly become clogged and ineffective.

It will be seen that the door structure is swingable about the vertical hinge at its forward end as at 83 by means of which it is attached to the adjacent portion of the picker housing 15 as is conventional practice. Furthermore, in addition to the before-mentioned trash discharge openings the bottom wall 39 and the picker housing is apertured as at 85 and 86 to permit sifting out trash and the like which may accumulate within the drum, however, these openings 85 and 86 are relatively remote from the inlet opening 62 in the drum door so that any cotton dropping down from the doffer is normally entrained in the air which is being sucked through the louvered structure through the apertures 80 into the rear compartment of the drum door as the air is moving under the divider panel 61 and into the discharge pipe 70 by means of which the cotton is directed through the fan structure 87 in a manner well known to the art and by the fan structure is delivered through the pressure line or conduits 88 into the tunnel 90 which is formed in the cover 91 of the basket generally designated 92 which is supported in conventional manner on the framework 3 of the carrier 2 as shown in U.S. Patent No. 2,558,951.

It will be seen that the inlet 93 at one end of the tunnel structure is formed in the front screen 94 which confronts the paneled rear side 95 and lateral pyramidal sides 96 and 97. It will be seen that the structure is composed of a skeletal framework 97 which has a substantially rectangular or quadrilateral bottom edging formed of integrated beams and that the corners which converge upwardly are also suitably reinforced by braces 99 and that the side panels or side structures 96 and 97 integrate adjacent to their upper edges with fore and aft extending upright panel means 100 and 101 which flank and support a grillwork in the shape of an arch and comprising a plurality of overlapping grid sections 103, each of which comprises a transverse bar 104 which is suitably secured as by bolts 106 to the adjacent portions of the side panels 100 and 101. It will be seen that each of the members 104 carries a series of rearwardly projecting grid bars or fingers 108 which extend generally parallel to the direction of flow of the material as best seen in FIGURE 1 but are spaced transversely thereof. Thus it will be seen that each of the grid panels 103 is individually adjustable to provide a baffle to control the flow of the material and that the spacing is such as to allow the trash to pass through and retain the cotton.

The construction of the tunnel for channelling and sifting out the additional dirt from the cotton in itself although it does separate the dirt from the cotton would not prevent remixing of the trash with the cotton in the basket and the invention herein contemplates the provision of solid wall surfaces or sections in the form of panels 110 and 111 and 112 and 113 which respectfully cover the rear halves or substantial portions of the sides 96 and 97 and entirely cover the rear side 95 of the cover. This prevents the dirt from drifting down and again mixing with the lint cotton by passing through screens or the like such as is conventional in cover structures of present type.

What is claimed is:

A picking unit for a cotton harvester comprising a vertically elongated housing having a peripheral side portion, a picking drum mounted in said housing, said drum having picking spindles extending laterally therefrom, said housing having a vertically extending opening in its side portion through which said spindles extend, said housing having a trash discharge opening, a cotton doffing means within the housing spaced beyond said opening, whereby when cotton and trash are brought into said housing by said spindles the trash will be permitted to depart out of the housing through said trash discharge opening while the cotton will be carried on and removed by said doffing means, said housing having a cotton discharge opening and a side portion adjacent to and beyond the doffing means for passing cotton removed by the doffing means, and door structure mounted on the housing closing the cotton discharge opening, said door structure having an outer panel including a series of vertically arranged louvers angled outwardly of the door structure and rearwardly and defining rearwardly opening substantially vertically elongated slots to permit the exit of large trash accumulations as they are deposited in the door structure and directing said accumulations to exit rearwardly, said door structure disposed to provide brushing contact of said outer panel and louvers with an adjacent row of cotton plants to facilitate exit of the trash therefrom.

References Cited in the file of this patent

UNITED STATES PATENTS

| | | |
|---|---|---|
| 2,558,951 | Hagen et al. | July 3, 1951 |
| 2,729,513 | Swim | Jan. 3, 1956 |
| 2,803,938 | Thomann | Aug. 27, 1957 |
| 2,904,948 | Hubbard | Sept. 22, 1959 |
| 2,930,177 | Hubbard | Mar. 29, 1960 |
| 2,986,861 | Hubbard | June 6, 1961 |